(12) United States Patent
Burt et al.

(10) Patent No.: US 8,830,340 B2
(45) Date of Patent: Sep. 9, 2014

(54) SYSTEM AND METHOD FOR HIGH PERFORMANCE IMAGE PROCESSING

(75) Inventors: Peter Jeffrey Burt, Princeton, NJ (US); John Robertson Tower, Yardley, PA (US); Gooitzen Siemen Van der Wal, Hopewell, NJ (US); David Alan Ackerman, Hopewell, NJ (US)

(73) Assignee: SRI International, Menlo Park, CA (US)

( * ) Notice: Subject to any disclaimer, the term of this patent is extended or adjusted under 35 U.S.C. 154(b) by 860 days.

(21) Appl. No.: 11/852,632

(22) Filed: Sep. 10, 2007

(65) Prior Publication Data

US 2008/0063294 A1    Mar. 13, 2008

Related U.S. Application Data

(60) Provisional application No. 60/843,122, filed on Sep. 8, 2006.

(51) Int. Cl.
*H04N 5/228* (2006.01)
*H04N 5/335* (2011.01)

(52) U.S. Cl.
USPC ........................ 348/222.1; 348/294

(58) Field of Classification Search
CPC .............................. H04N 5/228; H04N 5/335
USPC .............. 348/143, 222.1, 571, 572, 294, 298, 348/302, 308, 312; 358/448, 530; 250/370.09, 208.1; 257/290–292
See application file for complete search history.

(56) References Cited

U.S. PATENT DOCUMENTS

| | | | | |
|---|---|---|---|---|
| 5,773,832 A * | 6/1998 | Sayed et al. | .............. | 250/370.09 |
| 5,886,353 A * | 3/1999 | Spivey et al. | ............. | 250/370.09 |
| 6,236,428 B1 * | 5/2001 | Fukushima | .................... | 348/42 |
| 6,549,650 B1 * | 4/2003 | Ishikawa et al. | .............. | 382/154 |
| 2004/0109059 A1 * | 6/2004 | Kawakita | ...................... | 348/143 |
| 2005/0012840 A1 * | 1/2005 | Hsieh et al. | .................... | 348/308 |
| 2005/0131607 A1 * | 6/2005 | Breed | ............. | 701/45 |
| 2007/0075888 A1 * | 4/2007 | Kelly et al. | ................... | 341/155 |
| 2008/0316347 A1 * | 12/2008 | Gamal et al. | ................... | 348/296 |

OTHER PUBLICATIONS

Ni, Yank et al., "Histogram-Equalization-Based Adaptive Image Sensor for Real-Time Vision." IEEE Journal of Solid-State Circuits, vol. 32, pp. 1027-1036, vol. 32 (Jul. 1997).

* cited by examiner

*Primary Examiner* — Twyler Haskins
*Assistant Examiner* — Akshay Trehan
(74) *Attorney, Agent, or Firm* — Moser Taboada

(57) ABSTRACT

The present invention provides a method and a system for high performance image signal processing of continuous images in real time. The system comprising a focal plane array for generating continuous source image frames in real time. The focal plane array divided logically into blocks of sub-frames. The system also comprising an analog to digital converter (ADC) layer having an array of ADC elements for converting the source image frames into a digital data. The system further comprising a digital processor layer having an array of processing elements for processing the digital data and an interconnecting layer for connecting each one of the ADC elements and the digital processing elements substantially vertically to the focal plane and substantially parallel to one another. The processing comprising reducing image motion blur, increasing image dynamic range, increasing image depth of field and obtaining features of the images.

9 Claims, 6 Drawing Sheets

SYSTEM AND METHOD FOR HIGH PERFORMANCE IMAGE PROCESSING

CROSS-REFERENCE TO RELATED APPLICATIONS

This application claims the benefit of U.S. Provisional Patent Application No. 60/843,122 filed Sep. 8, 2006, the entire disclosure of which is incorporated herein by reference.

FIELD OF THE INVENTION

The invention relates generally to image processing system. More specifically, the invention relates to a system and method for providing a novel means for providing high performance of digital processing of images for real time continuous operation.

BACKGROUND OF THE INVENTION

In the prior art there are examples of systems and devices that have some but not all of the elements of the integrated sensor processor (ISP). Designs exist today that perform some image processing in the analog domain within the pixel plane. However such analog domain processing lacks the precision and computational flexibility of the digital domain processing. Other designs exist today in which image data are converted to the digital domain by an array of Analog to Digital Converter (ADC). However these existing designs use the ADC to achieve faster data transfer off the pixel plane but do not include the additional array of general purpose processing elements.

Moreover, devices exist today in which the sensor focal plane is operated at high frame rates and the frames are combined to generate a new sequence at reduced frame rate but enhanced quality images. Specifically this has been done to increase sensor dynamic range. However current art does not include the general purpose computing, and the motion adaptive components used in the ISP to implement motion adaptive signal integration (MASI).

Furthermore, the principle of aligning and combining multiple video frames in MASI to achieve an enhanced result is not new. This type of processing is used to reduce noise and improve resolution ("super resolution"). For the most part such processing is not done as a continuous process on video, but rather it is perform on selected sets of vide frames not in real time. Continuous real time processing has been implemented for the case of translation motion when this can be estimated from the motion of the camera. These current real time implementations do not allow for general motion, nor do they estimate the image motion through an image analysis step.

So, a need exists in the art to built an improved system which overcomes the deficiencies of prior art and provides a very fast, efficient and high performance image signal processing of continuous images in real time.

SUMMARY OF THE INVENTION

[Note to Rohini: Insert Broad Claims Upon Final]

DETAILED DESCRIPTION OF THE INVENTION

Integrated Sensor/Processor

Figure 1A:
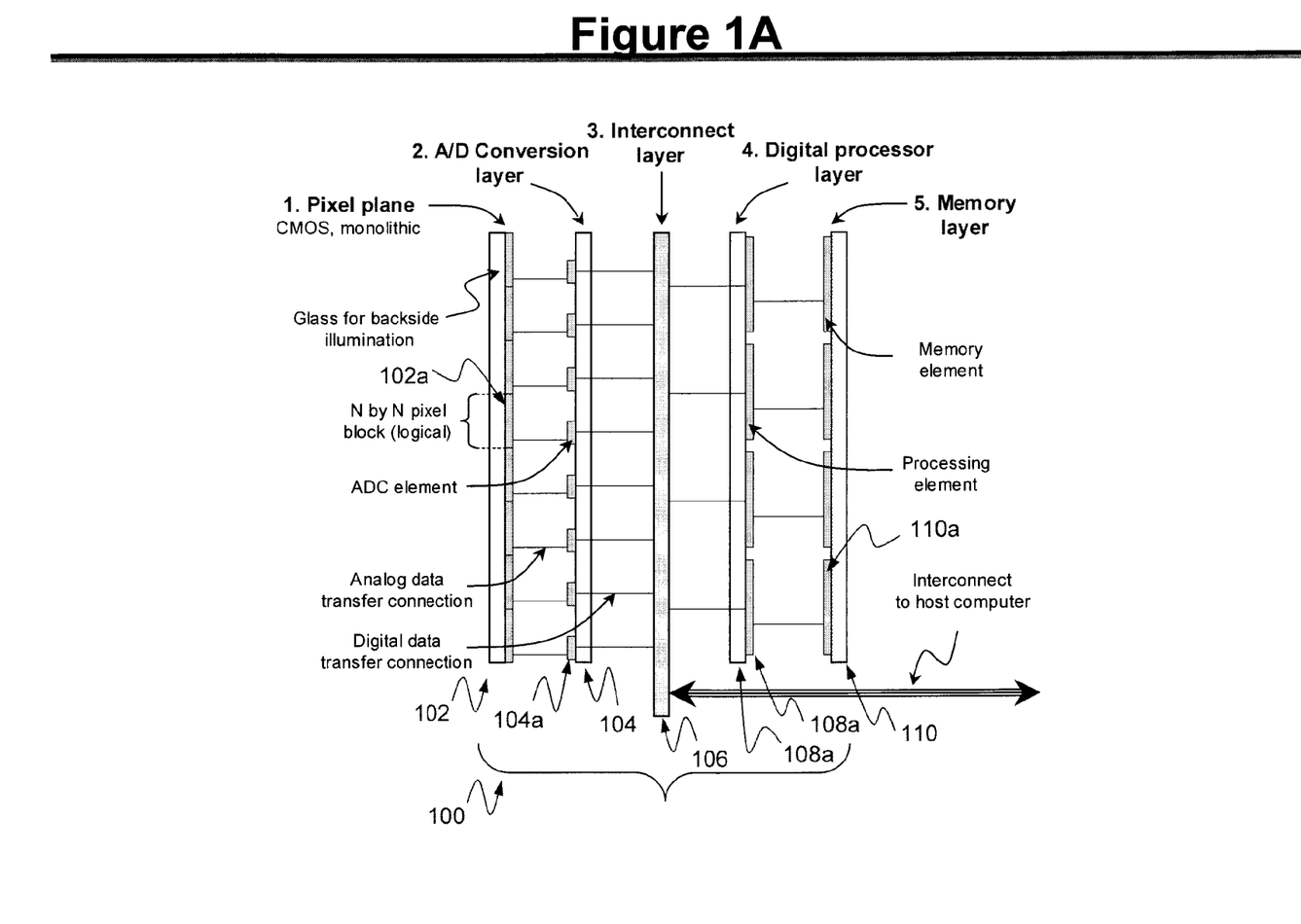
FIG. 1A illustrates a schematic diagram of the integrated sensor processor (ISP) as a layered device in accordance with an embodiment of the present invention.

Referring to FIG. 1A, there is illustrated a diagram of an integrated sensor processor (ISP) 100 as a layered device, in which a imaging sensor, preferably a large video sensor, is tightly coupled with an array of digital image processing elements such that the sensor pixel array is logically divided into blocks of pixels, and one processing element is dedicated to the processing of data from each block. In the configuration shown in FIG. 1A, the ISP 100 consists of a five parallel layers that are connected by data paths from layer to layer. These layers include a focal plane array 102, which is a two-dimensional image sensor. The focal plane array 102 is divided logically into blocks 102a of pixels, shown as N by N. The ISP 100 also consists of an analog to digital conversion (ADC) layer 104, which consists of an array of ADC devices/elements 104a, one for each block of pixels. Also included is an interconnect layer 106 which provides communications of digital data between the ADC 104 and associated processing elements (defined below), between neighboring processing elements and between processing elements (and the ADC elements) and an external device, such as a host computer. The ISP 100 also consists of a digital processor layer (a.k.a. PE layer) 108, consisting of an array of processing elements (PE) 108a, one for each ADC element 104a or local group of ADCs 104a. Further included is a memory layer 110 consisting of an array of memory elements 110a, one for each processing element 108a.

The ISP 100 is designed to allow very large sensors to be operated at very high frame rates that are not feasible with conventional sensor designs because data cannot be communicated off the sensor array fast enough with designs that transfer data to the edges of the sensor pixel plane for A/D conversion and processing. The ISP 100 is also designed to support distributed, programmable, precise digital processing of image data at very high rates. This level of processing is not possible with existing designs that propose to incorporate processing within the sensor array through analog logic.

The processing elements (PE) are programmable so a given device can be made to perform a wide variety of functions. In general individual PE are general-purpose digital signal processing devices which are programmable and capable of complex and high precision operations. Normally all processing elements will perform the same operation on their respected data sets, in parallel.

The fabrication technique suggested in FIG. 1A makes the following assumptions. The pixel plane 102 is built as a single monolithic device. The ADC 104, PE 108 and memory layers 110 are tiled, and mounted on the sensor 100. The interconnect layer 106 is fabricated on the ADC 104 layer once this has been assembled on the pixel array. The pixel plane 102 is constructed in CMOS technology and is preferably back illuminated. This provides for high fill factor and direct connection to the ADC layer 104, e.g., through bump bonds. The ADC layer 104 is connected to the interconnect layer 106 through vias that lead through the silicon substrate on which the ADC is mounted. The PE layer 108 and the memory layers 110 preferably face one another so that these can also be connected directly. The PE layer 108 is connected to the interconnect layer 106 through vias through the silicon substrate on which the PEs are mounted.

It should be noted that other architectures and fabrication techniques besides the one described above can be used. For example, the pixel plane 102 may be tiled and need not be CMOS. The interconnect layer 106 need not be between the ADC 104 and the PE layers 108. Memory may be integrated on the PE layer 108 or memory elements may be shared by multiple processing elements.

Figure 1B:
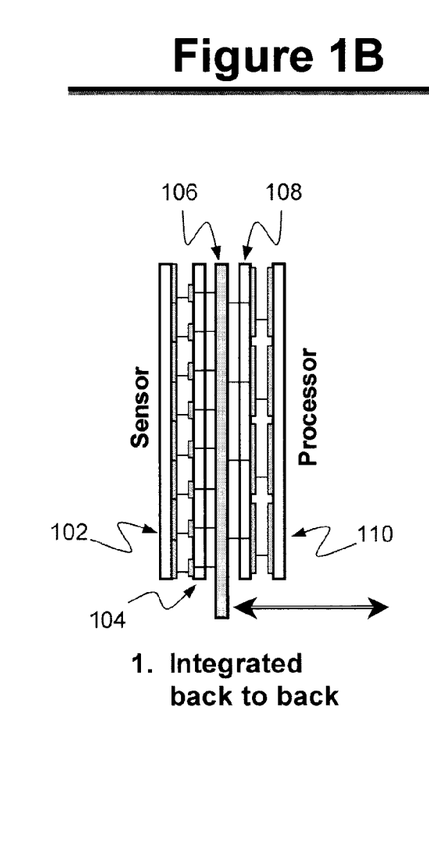
FIG. 1B illustrates a schematic diagram of an alternate ISP configuration in accordance with one embodiment of the present invention.
Figure 1C:
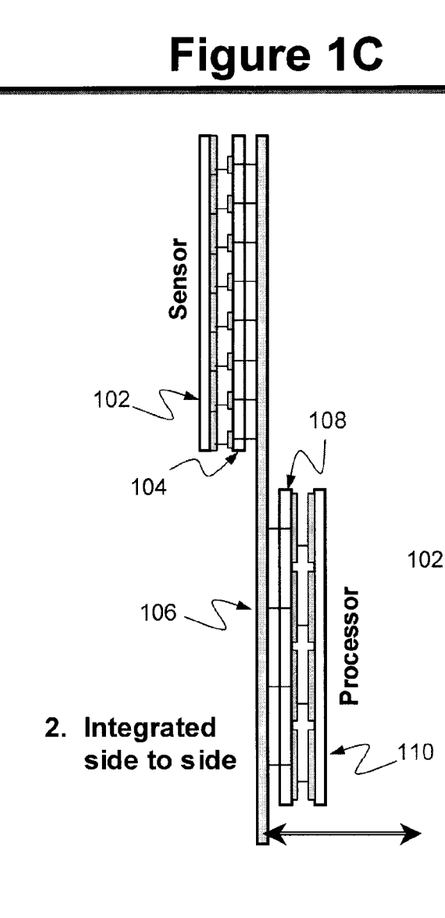
FIG. 1C illustrates a schematic diagram of an alternate ISP configuration in accordance with another embodiment of the present invention.
Figure 1D:
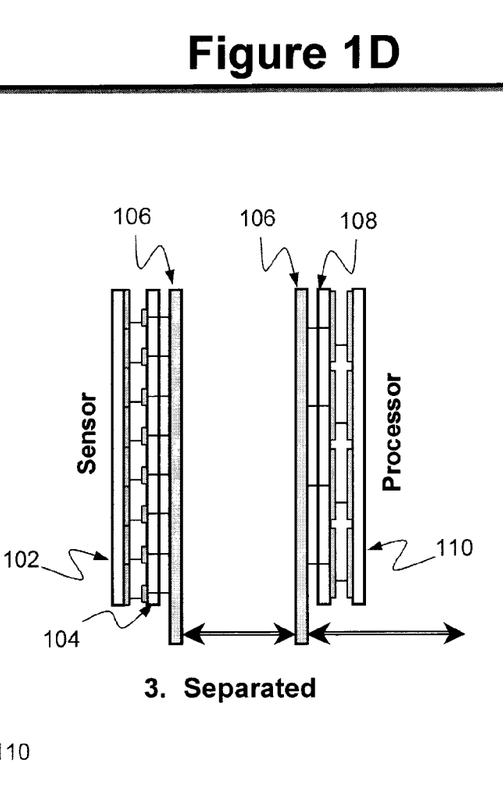
FIG. 1D illustrates a schematic diagram of an alternate ISP configuration in accordance with further embodiment of the present invention.

Further the sensing and processing components of the ISP 100 need not be mounted back to back, as is shown in FIG. 1A. Alternative designs such as shown in FIGS. 1B, 1C and 1D may preferably be utilized. For example, FIG. 1B illustrates the components of the ISP 100 are mounted back to back using the common interconnect layer 106. Alternatively, the components are mounted side to side using the common interconnect layer 106 as shown in FIG. 1C. In another alternate configuration, the components of the ISP 100 are mounted separately with their own interconnect layers 106 connected to one another through another interconnect channel, (such as a ribbon cable) as shown in FIG. 1D. Even though the configurations may vary, they are all built from similar sensor and processor modules. The sensor module 100 consists of the pixel array 102, the array of ADC devices 104, and an interconnect layer 106. The processor module 108 consists of the PE array 108a, the memory array 110 and the interconnect layer 106.

Furthermore, the configurations perform the same sensing and processing functions but are suited for different sensor formats. For example, the back to back configuration disclosed in FIG. 1A is essential for very large images (e.g., 10 k by 10 k) since data rates are so high that data must be sent directly from the ADC devices to the associated PE. The side-by-side configuration as disclosed in FIG. 1B is suited for medium sized sensors or for IR sensors, which require that the sensor be cooled. As an example these may be 2 k by 2 k pixels. The separated configuration as disclosed in FIG. 1C is best suited for small sensors, e.g., 512 by 512 pixels. In this case it is feasible to provide communications through a ribbon cable, and this provides some flexibility in fabrication.

Further alternations in the designs can be used. When the processing module is separate from the sensor module as shown in the separate configuration of FIG. 1B, it is not necessary for them to be the same physical size, so that larger and more powerful processing elements can be used. Also the processing and memory elements can be mounted either side of the interconnect layer in the integrated side to side configuration of FIG. 1C, thus, avoiding the need for via connectors. Furthermore, it is not necessary for all processing elements to perform the same operations, analysis can be adapted to content within local regions of the image.

Note that in a typical operation, sensing and processing may be performed in an uniform manner across the image array and over time. However the ISP architecture allows the system to adapt locally to imaging conditions and to objects of interest. Adaptation can be done independently for each pixel domain. For example, pixel plane integration time, ADC quantization parameters and digital processing steps can be different for each PE and pixel domain.

Figure 2A:
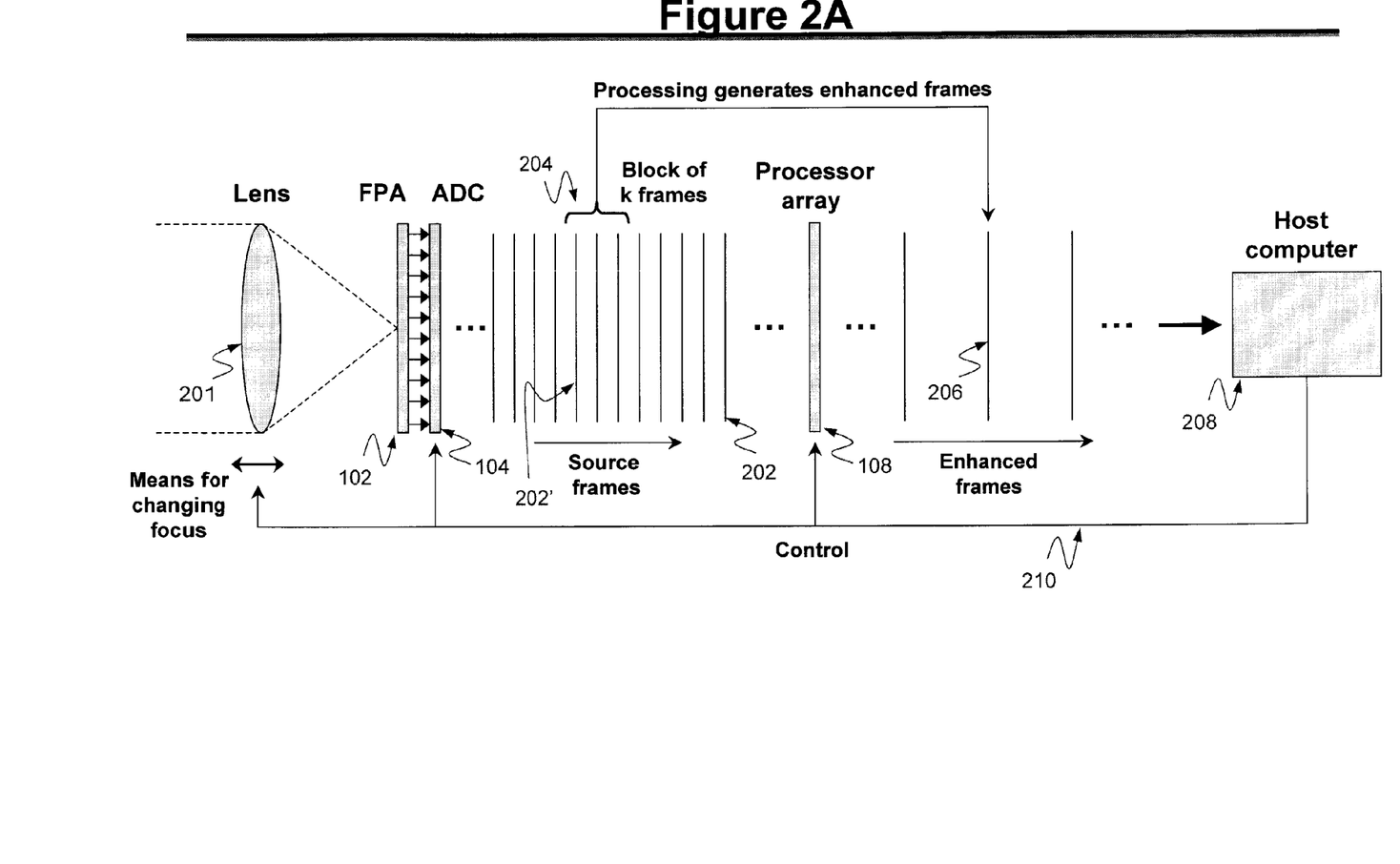
FIG. 2A illustrates a model for ISP processing in accordance with one embodiment of the present invention.

FIG. 2A shows key elements of the processing of the ISP 100 in accordance with one embodiment of the present invention. A focal plane array 102 operates at a relatively high frame rate to generate a sequence of image source frames (or sub-frames) 202, preferably continuous video frames in real time obtained from a sensor lens 201. Each of the source frames 202 are divided logically into blocks 204 of k sub-frames 202'. The sub-images 202' within a given block 204 are obtained under slightly different imaging conditions. These differences are exploited prior to the processing by the processor array 108. So, initially an imaging parameter of the source frames 202 are being changed within the blocks 202 of sub-frames 202'. These imaging parameters may be changed by some mechanical or physical means. For example, in a basic case, the camera moves between sub-frames 202'. So, these sub-frames 202' may preferably be first aligned to compensate for image motion. After alignment, the sub-frames 202' are combined through an appropriate "fusion" process (described below). This provides enhanced signal to noise while maintaining low motion blur.

Further each block 204 of sub-frames 202' with slightly different imaging conditions are then processed and combined by the processor array 108 to form a single enhanced frame 206. This process is repeated for all the source frames 202. So, the processor array 108 functions to further change the imaging conditions for each of the sub frames 202' and then combines them to generate an output of enhanced image frame 206. A sequence of enhanced frames 206 is the output from the ISP 100 at a reduced frame rate. At the same time the processing array 108 may preferably extract other features or characteristics of the source image frames 202 and provide these as another output frames 206. These output frames 206 are provided to a host system 208 for further analysis and exploitation. Imaging conditions may desirably be changed in many ways to provide enhanced output images. Various means for enhancing images are provided in greater detail herein below.

Enhancement of Images:

A. Increasing Image Signal/Noise Ratio

A basic measure of image quality is the signal to noise (S/N) ratio. In general this aspect of quality can be increased by increasing the "exposure". Typically this is done by increasing the aperture size of the sensor lens 201 or integration time of the focal plane 102 as shown in FIG. 2A. Each of these means provide potential S/N improvements but also has its limitations. Larger aperture requires larger optics. Also increasing the aperture reduces the depth of field. If the camera/sensor is moving, or there are moving objects in the field of view, then longer integration time leads to motion blur.

Today integration is done primarily on the focal plane array 102, prior to analog to digital conversion. Typically the signal component of an image grows in proportion to the integration time, while noise grows as the square root of integrations. Thus the signal to noise ratio grows as the square root of integration. When there is motion, integration time on the focal plane 102 must be limited to the time it take features to move one pixel sample distance.

Integration can also be performed in the digital domain, after analog to digital conversion 104. In this case multiple images are taken of the scene, each having a short focal plane integration to avoid blur. Then, these images are aligned and summed in the digital domain by the digital processor array 108. Again signal/noise grows roughly as the square root of the number of images summed. Alignment is performed to compensate for motion where each frame is displaced and "resampled" to a common reference frame, and then added by the digital processor array 108. As an example, the first frame 202' of a block of frames, 204 may be taken as the reference. Motion analysis within the processor array 108 is used to determine how each subsequent frame 202' of the block 204 is shifted relative to the first frame 202'. Based on this motion estimate, each subsequent frame 202' is then shifted back digitally to be in alignment with the reference frame, i.e. the first frame 202' in this example. In general, a shifted image may have samples (pixels) that fall between the samples of the reference. In this case, samples of the shifted image are interpolated at the pixel positions of the reference based on neighboring sample values, this is commonly known as resampling.

The process described above is a "motion adaptive signal integration", or MASI. The principle of MASI is well known. However in the past its application has been limited to non real time applications or to simple translations due to camera pan. The ISP 100 of the present invention, however, provides a framework for performing general MASI, in real time. This is enabled by the ability to operate the FPA 102 at very high frame rate, and then the ability to process this video in real time to generate the lower frame rate enhanced output frames. In this case the blocks 204 of k subframes 202' are aligned by the processor array 108 to generate each enhance image 206. The S/N improvement is roughly the square root of k.

Alternatively, the MASI process can be used to reduce motion blur for a given S/N ratio. Suppose an integration time of T is required to achieve a certain desired S/N level under given imaging conditions. And suppose an output frame rate of F frame per second is desired. In the standard approach each image would be integrated for T on the focal plane. In the MASI approach the FPA 102 would be used to generate frames at k time F frames per second, but each integrated by time T/k. Blocks of k subframes would then be aligned and added by the digital processor array 108 to form enhanced frames at the desired rate of F per second. The MASI process in this case would provide roughly the same S/N as the standard approach in which integration is done on the focal plane array 102, but motion blur would be reduced by a factor of k.

As an example suppose the standard frame rate is 30 frames per second and each frame is integrated on the focal plane for 8 msec. For "8 fold MASI" (k=8) there will be 240 sub-frames per second, each integrated for 1 msec. After digitization, alignment and summation in the digital domain the output frames will again be at 30 frames per second, but motion blur will be reduced by a factor of 8.

Frame to frame motion estimation can be done by any of a number of well-known methods. This must be highly precise to ensure images are aligned to a fraction of a pixel. The alignment is typically based on a parametric model of the global offset between images, such as an affine model (translation, rotation and skew). The model may be "piece-wise" parametric, with a separate set of parameters estimated within each pixel block of an ISP sensor. Parametric models can compensate for image offsets due primarily to camera motion. The alignment can be based on more general motion "flow" in order to compensate for parallax motion and the motion of objects in the scene.

The MASI process may also be used to implement "super resolution". This process is known in the art, and provides means to increase the effective resolution of an image. In the case of the ISP, super resolution is enabled by representing the enhanced image 206 at a higher sample density than the input source images 202. Source images are individually "upsampled" as part of the alignment process, by interpolating samples at the higher sample density of the output image.

B. Increasing Image Dynamic Range

One approach to enhance the image is by increasing image dynamic range. The term "dynamic range" indicates the number of intensity levels used to represent a digitized image. This is determined first by the A/D converter 104 of the ISP 100. For example, an 8 bit converter could provide 256 intensity levels. However not all of these available levels may be used in a given image. An under exposed image will occupy only the lower valued levels. It will have an correspondingly lower dynamic range. Thus, in order to maximize dynamic range of images obtained using a standard camera, care is taken to adjust the image exposure so that bright areas of the image are near the top of the A/D capture range. Alternatively the quantization step size and range of the A/D can be adjusted to match the intensity range of the image. However dynamic range will often still be a limiting factor in sensor performance.

It is well known that an image with extended dynamic range can be constructed by combining two images of the same scene that have been obtained with different camera settings. For example one image may be obtained with a long exposure and anther with a short exposure. The long exposure image provides better response in dark regions of the scene but may be "saturated" in the bright regions of the scene. Saturation occurs where the image value exceeds the range of the A/D converter. The short exposure image may show little detail in the dark regions but captures the bright regions without saturation. The two images are then combined digitally by the digital processor array 108 to form a single extended dynamic range image. In this combination process, each pixel of the enhanced image, 206, is copied from one of the source images, 202. Specifically, at each sample position, the pixel value is copied from that source which has the smallest step size at that position without being saturated. The resulting enhanced image, 206, has the same range of values as the source images, but has increased dynamic range because it is represented by more steps, and the ration of the full range to the smallest step size is larger.

Alternatively, an extended dynamic range image can be formed from two images of the scene obtained with the same exposure, but different settings of the A/D converter. An A/D converter will typically have a fixed number of quantization steps, however the step size can be adjusted. Increasing step size increases the maximum image value that can be handled by the A/D converter without saturation. Decreasing the step size improves the system's ability to represent small differences in image intensity. In order to obtain an extended dynamic range image, two source images are obtained with different AID step size settings. The extended dynamic range image is formed pixel by pixel by selecting the valued of the small step size source except where they are saturated, in which case, the value is taken from the large step size image.

In the present invention, these methods are adopted to the processing framework of the ISP. As shown in FIG. 2A, the FPA, 102, is used to capture images at a relatively high frame rate. The system causes the exposure or A/D setting to be changed for each source image, 202, within a block of k images, 204. The processor array, 108, then combines these k source images into a single extended dynamic range image, 206. These enhanced images exit the ISP at a relatively lower frame rate.

Figure 3:
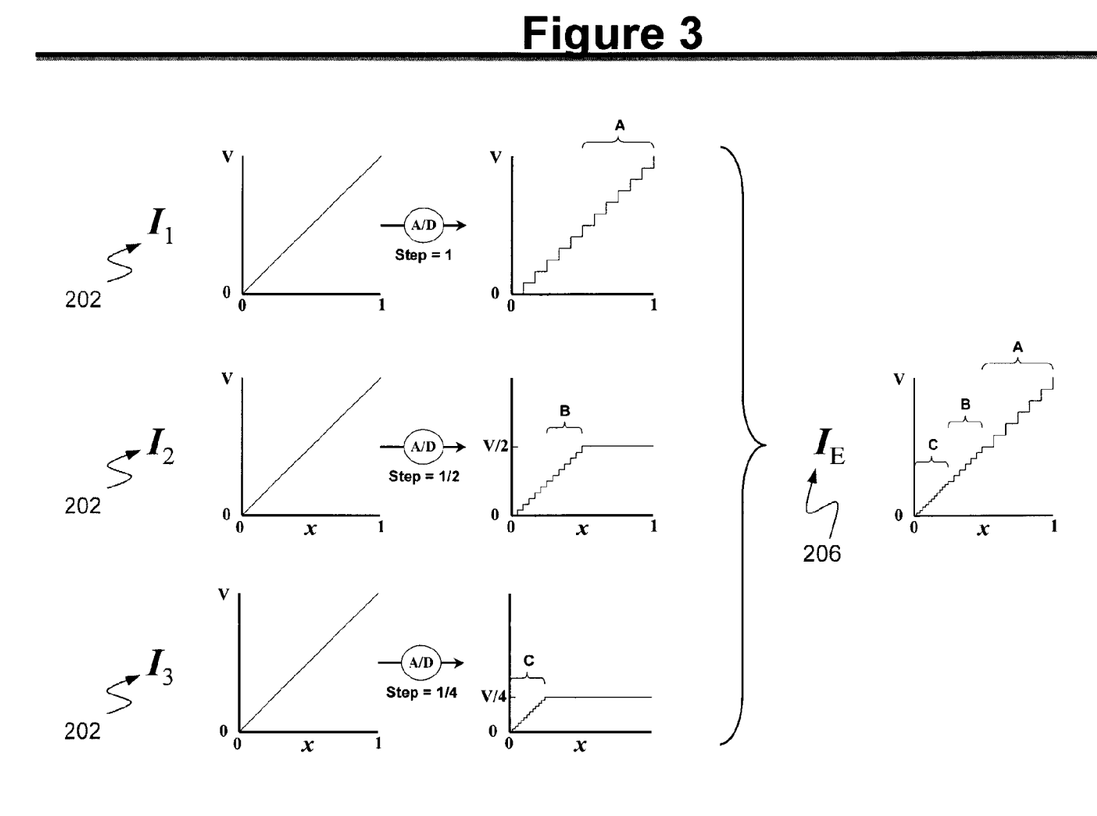
FIG. 3 illustrates an exemplary graphical diagram of steps to form an extended dynamic range image in accordance with a preferred embodiment of the present invention.

FIG. 3 shows an exemplary graphical diagram to illustrate the steps in controlling exposure within a block of source image 202 and in combining these images 202 to form an extended dynamic range image 206. This is shown for the case in which the A/D step size is changed from one source image 202 to the next. The example assumes three source images 202 per block 204 and step size is reduced by half from each source image to the next. Further, to simplify the diagram, we assume the source image consists of a simple intensity ramp that increases in value from zero on the left to V on the right. We also assume the A/D converter has V steps, so that it can accommodate the full range of the source image when the step size is set to 1.

Three source images 202, $I_1$, $I_2$ and $I_3$ are captured with the A/D step size set to 1, ½ and ¼, respectively. Note that when step size is 1, the A/D converter captures the full range of the source image but with relatively coarse steps. When step size is ½ the digitized image saturates on the right half, where the source image value is larger than V/2. When step size is ¼, the digitized image saturates on the right three quarters of the image, for which the source exceeds V/4. However where $I_2$ and $I_3$ are not saturated they have an advantage over $I_1$ in having smaller step size. The extended dynamic range image, $I_E$, is formed by selecting the regions of the source images 202 that have smallest step size without being saturated. Thus region A is selected from I1, region B is selected from I2, and region C, is selected from C and further combined by the digital processor array 108 into a single extended range image 206.

This example is given to be illustrative of the proposed method. In general the number of images k in a block can preferably be larger or smaller than three. The exposure change between source image can be other than by factors of two. Exposure setting can be changed by other means, such as changing the aperture size. Preferably, integration time, aperture size, and A/D step size can also be changed in combination. In practice the method of changing the step size of the A/D converter may preferably be implemented by amplifying the image signal prior to A/D conversion, while keeping the A/D converter step size fixed. The basic rule for combing source images into the extended dynamic range image is that within any given region, the source with the smallest step size is used that is not saturated. The method described above requires selection on a pixel by pixel basis. Alternatively the images can be combined in a multiresolution wavelet, or pyramid transform domain, which are methods known in the art.

C. Increasing Image Depth of Field

Another approach to enhance the image is by increasing image depth of field. The depth of field of an image is determined by the size of the aperture used in the camera system. A larger aperture leads to a smaller depth of field. In order to extend the depth of field, one may reduce the aperture size, but this leads to a reduced signal/noise ratio, if the temporal integration is held fixed, or it leads to increased motion blur if the time integration is increased to compensate for reduction in the aperture.

It is well known that the effective depth of field of an image can be increased by combining multiple images of a given scene obtained with slightly different focal setting. Each region of the extended depth of field image is obtained from that source image for which the corresponding region includes the best focus. It is known that an effective means for this image combination is multiresolution image fusion. This avoids seams between regions between regions taken from different source images. Each source is first transformed into its wavelet or Laplacian pyramid representation. Samples of a corresponding transform representation of the enhanced image are copied from the corresponding samples of the source image which is in best focus within a local region. The final enhanced image is then obtained through an inverse transform.

While known, this approach to extending the depth of field of an image has been applied to the construction of single images, however, has not been applied to video images. In the present invention, there is provided a means for extending the effective depth of field of video images by incorporating these steps within the frame work of ISP processing as shown in FIG. 2a. A mechanism is provided to change the focus setting rapidly. This may be through moving the lens 201, as shown in FIG. 2a, or by moving the focal plane (not shown). For example, the FPA 102 may be mounted on a piezoelectric device which is driven electrically to move the focal plane. Other means may also be used for changing the effective focal length of the camera. The focal plane array, 102, is used to generate image frames at a relatively high frame rate, while the focus setting is changed from frame to frame. Each frame, 202' in a block of frames 204, is obtained with a different focus setting. The images of the block are then aligned and combined by the processor array, 108, to obtain an extended depth of field image, 206.

Figure 4:
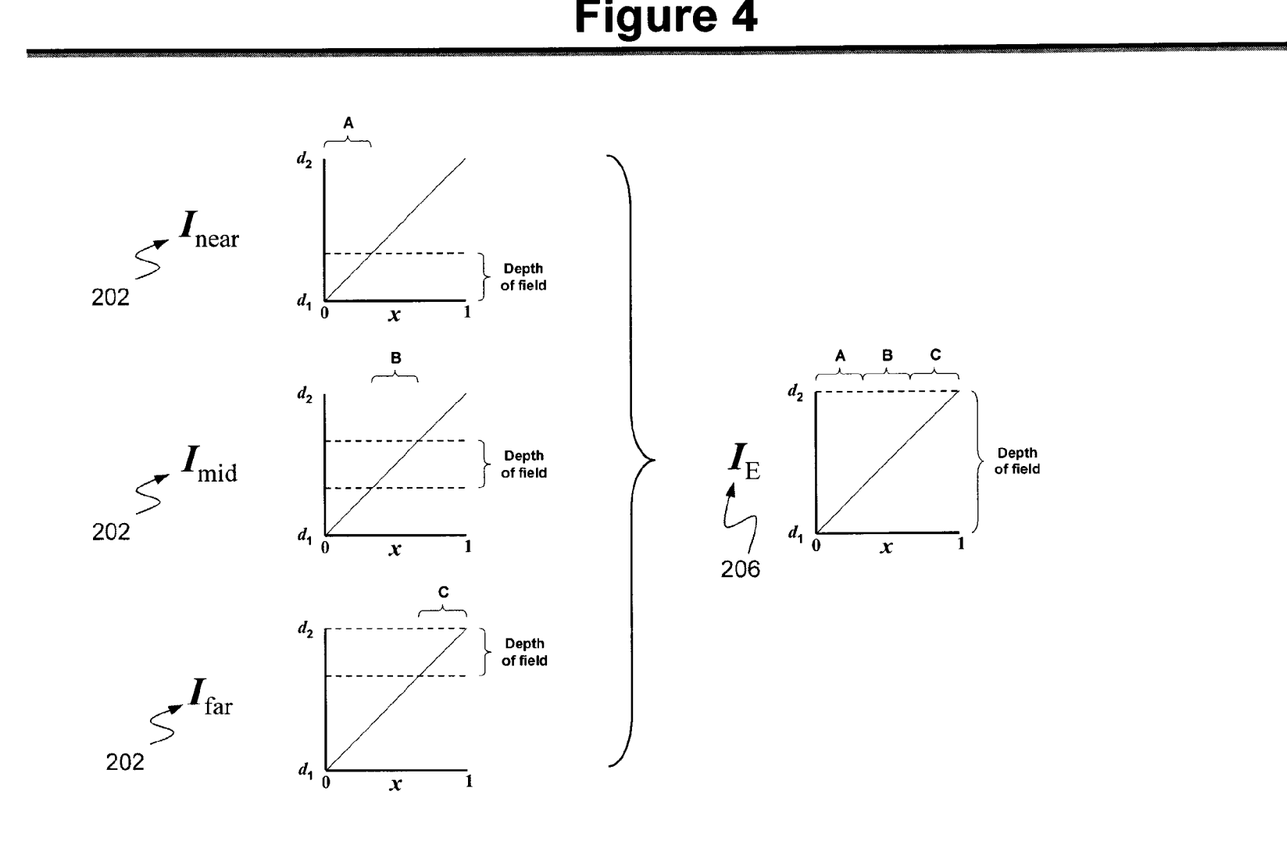
FIG. 4 illustrates an exemplary graphical diagram of steps to form an extended depth of field image in accordance with a preferred embodiment of the present invention.

The steps used to construct each extended depth of field image are shown in FIG. 4. Here to simplify the diagram we assume the number of frames k in the block 204 of frames 202' is three. Within a block 204 of frames 202', three source images 202 are captured with different focus settings, $I_{near}$, $I_{mid}$, and $I_{far}$, corresponding to relatively near, middle and far focus settings, respectively. These are combined by the digital processor array 108 to form the extended depth of field image, $I_E$ 206. The image shows distance to surfaces in the scene as a function of image position. To simplify the diagram the image is assumed to be a tilted surface that extends from a relatively near position, $d_1$, on the left, to a more distant position, $d_2$, on the right. Each image is in focus only for a region that falls within a corresponding depth of field. Thus for $I_{near}$ the region A is in focus, while B is in focus in $I_{mid}$, and C is in focus in $I_{far}$. These in-focus regions are combined to form the extended depth of field image, $I_E$ 206.

Feature Sets:

In addition to providing enhanced images, the processing stage of an ISP 100 can compute feature or attribute "images" that indicate local properties of an image. Such feature images can be used by the host system to perform such functions as visual navigation, object recognition and landmark recognition.

Figure 2B:
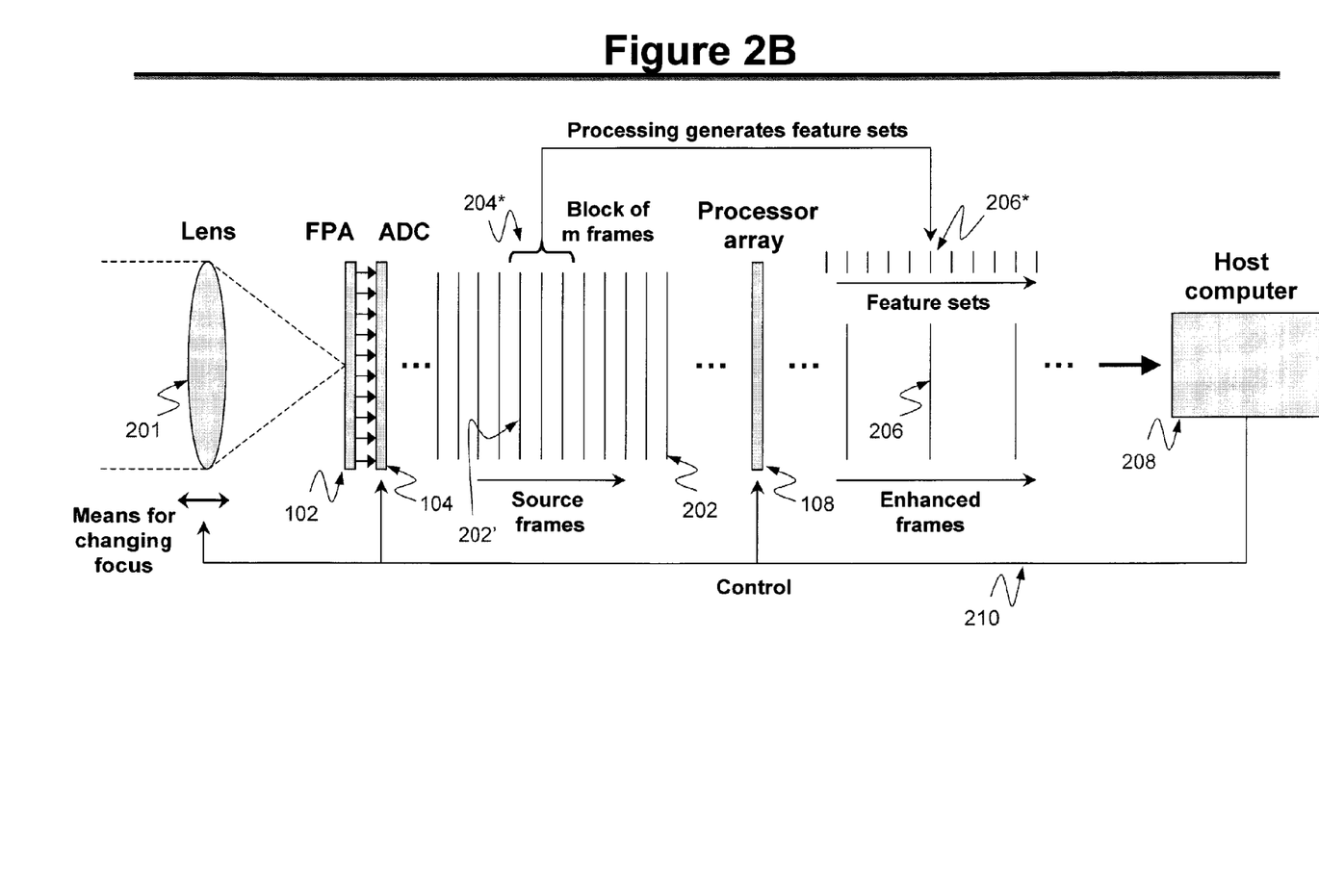
FIG. 2B illustrates a model for ISP processing in accordance with another embodiment of the present invention.

The feature set generation processing of the ISP 100 is shown in FIG. 2b in accordance with another embodiment of the present invention. At each frame time a block 204* of m source images are processed in the processor array 108, to generate set of feature images or descriptors, 206*. The features are sent to a external user, such as the host computer 208. The block size m may preferably be equal to k but need not be. Feature sets may be generated at the same rate as the source frame rate, or at the reduced rate of the output enhanced images, 206. A given feature image may be computed by convolving a filter with the data within the block 204 of source images 202. Such filters may be specific to features of interest in the image, such as edges. Alternatively a feature image may computed as a statistical measure, such a mean value or variance, within a neighborhood of each pixel. Feature sets may include any function computed on a block of images. Examples include global and local statistical measures, pattern selective filters (such as spatial edges and temporal motion), image transforms, and pattern detection based on the presence of prescribed sets of features. Feature sets may be represented as sample arrays with dimensions of space and time, or lists that indicated the location of detected features. Features may also represent as parametric functions.

One feature type of particular importance is range, more specifically 3D range estimates. When the camera is moving relative to a scene the motion of nearby objects in the scene will appear faster than more distant objects, due to motion parallax. The motion is measured on a pixel by pixel basis as motion flow by the MASI process. If the motion of the camera is known, the ISP 100 can convert motion flow measures to range measures. As an example, if the camera is moving in a straight line at a given velocity, the distance to a given stationary object in the scene is proportional to the ratio of the camera velocity to the observed object motion, as computed by motion flow analysis, i.e. objects that appear to move fast are near, while objects that appear to move slow are far. Camera motion can be measured by other means, such as an inertial measurement unit (IMU) within the host system, or by tracking points in the scene, in a process known as "visual navigation".

Another function enabled by integrated sensing and processing is selective transmission of image data out of the ISP. Analysis is used to detect regions of interest or change within the scene, and then data relating to these regions is transmitted selectively at higher rate or fidelity.

Furthermore, the ISP can be used to detect specific features of interest and indicate their locations within the scene. Feature definitions are provided to the ISP by the external analysis or control system for example as filters or templates. These are correlated with image data by the ISP. The ISP then reports the locations of detected features as a list of image coordinates or feature maps. The ISP can perform other functions commonly performed on imagery data, such as contrast enhancement, fusion, compression etc.

Feedback Control:

The ISP system includes a feedback control signal component 210 from an external control device, such as the host computer 208 as shown in FIGS. 2a and 2b. This control 210 can specify the types of operations to be performed by the ISP 100. The control 210 can preferably change focus and exposure setting for the FPA 102 and ADC 104. It can also specify computations to be performed in the processor array, 108.

The control 210 can further provide parameter or other data used in the computations within the processor array 108. This may include an expected pattern of image attributes or features. These can provide a seed to the analysis, which can then refines the expected pattern based on the current imagery or detect differences from the expected pattern. The control data 210 can also include reference images, so that processing of source images 202 can be done relative to a reference. As an example, the reference image may be a prior image of the same scene, in which case the processing can determine change relative to the reference. As another example, the reference cam be an image from a second imaging sensor that is spatially displaced from the ISP 100. In this case processing can estimate range to objects in the scene based on stereo.

Note that the methods described above for processing the images to generate enhanced frames/images and features sets may be performed separately or simultaneously by the processor array 108.

The present invention as described above provides for variants of the ISP 100 in which focus, exposure, and viewing direction (motion) are changed between source frames of a block 204 in order to generate extended depth of field, dynamic range, or S/N images 206. It should be noted that other aspects of the camera system could also be varied. As another important example, the spectral band of the light being sensed by the focal plane 102 could be changed systematically within each block of frames. The resultant images 202' would be combined by the processor array 108 to form an enhanced image 206 in which differences between spectral bands are exploited.

Furthermore, it is important to note that the methods described above for a video camera can also be applied for a still image camera, such as a SLR, or consumer digital camera with same applications. In such as case, the press of the trigger would initiate capture of a set of sub frames in rapid succession. Such imaging parameters as focus and exposure (or A/D conversion gain) can be varied with each sub frame. Processing then combines the sub frames via the MASI process into an enhanced image with reduced motion blur, extended dynamic range, extended depth of field, or other attribute. It may also generate feature sets useful in object recognition, or indexing into an image database.

Although various embodiments that incorporate the teachings of the present invention have been shown and described in detail herein, those skilled in the art can readily devise many other varied embodiments that still incorporate these teachings without departing from the spirit and the scope of the invention.

The invention claimed is:

1. An image signal processing system for an integrated sensor processor for capturing different portions of a single two-dimensional (2D) viewpoint, comprising:
   a focal plane array comprising an array of focal plane elements for generating continuous source image frames in real time of the single 2D viewpoint, said focal plane array divided logically causing each focal plane element in the array of focal plane elements to produce a block of pixels;
   an analog to digital converter (ADC) layer having an array of ADC elements, the array of ADC elements coupled in an element to element correspondence with the array of focal plane elements, for converting the source image frames into digital image data, wherein each of the ADC elements has an adjustable quantization step size for extending dynamic range of the sensor;
   a digital processor layer having an array of programmable digital processing elements for performing one or more substantially simultaneous programmable operations on the digital image data, wherein each digital processing element is assigned to one or more of the ADC elements, for integrating the digital image data to form enhanced output frames for each operation performed, wherein a sequence of the enhanced output frames has a lesser frame rate than the rate of generating the continuous source image frames, wherein each of the digital processing elements is dedicated to processing a block of pixels; and
   an interconnecting layer fabricated on the ADC layer for connecting each one of the ADC elements and the digital processing elements creating a physical element coupling substantially vertically to the focal plane and substantially parallel to one another.

2. The system of claim 1 wherein the interconnecting layer provides for communications of the digital image data between the ADC layer and the digital processor layer.

3. The system of claim 1 wherein the interconnecting layer provides for communications of the digital image data between an external device and each of the ADC layer and the digital processor layer.

4. The system of claim 1 further comprising a memory layer having an array of memory elements for storing the digital image data processed by the digital processor layer.

5. The system of claim 1 wherein the digital processor layer is mounted back to back with the focal plane array.

6. The system of claim 1 wherein the digital processor layer is mounted side to side with the focal plane array.

7. The system of claim 1 wherein the digital processor layer is displaced from the focal plane array, and the digital processor layer and the focal plane array are connected to each other by a data communications link having a sensing and processing connectivity.

8. The system of claim 1 further comprising a feedback control signal component to control functions of the focal plane array.

9. The system of claim 8 wherein the feedback control signal component controls functions of the digital processor layer.

* * * * *